United States Patent [19]

Eckenbrecht et al.

[11] 3,751,588

[45] Aug. 7, 1973

[54] VERTICAL SYNCHRONIZING CIRCUITRY

[75] Inventors: Robert Roy Eckenbrecht, Bethany; Dong Woo Rhee, Williamsville, both of N.Y.

[73] Assignee: GTE Sylvania Incorporated, Seneca Falls, N.Y.

[22] Filed: June 2, 1972

[21] Appl. No.: 259,159

[52] U.S. Cl. .......................... 178/7.3 S, 178/69.5 TV
[51] Int. Cl. .............................................. H04n 5/10
[58] Field of Search .................... 178/69.5 TV, 7.35, 178/7.3 R, 7.5 S, 7.5 R; 328/139, 155; 307/269, 234

[56] References Cited

UNITED STATES PATENTS

| | | | |
|---|---|---|---|
| 2,752,424 | 6/1956 | Pugsley | 178/69.5 TV |
| 3,336,440 | 8/1967 | Blake et al. | 178/69.5 TV |
| 3,530,238 | 9/1970 | Matarese | 178/69.5 TV |
| 3,688,037 | 8/1972 | Ipri | 178/69.5 TV |
| 3,708,621 | 1/1973 | Yamamoto | 178/69.5 TV |

*Primary Examiner*—Robert L. Griffin
*Assistant Examiner*—John C. Martin
*Attorney*—Norman J. O'Malley, Robert E. Walrath et al.

[57] ABSTRACT

A vertical synchronizing circuit including a counter is shown. The counter counts a predetermined number of pulses synchronized with the received television signal, such as the horizontal oscillator output pulses, and then recycles providing a vertical output pulse. The circuitry includes a provision for periodically synchronizing the counter which is highly noise immune. The circuitry includes a further provision for detecting non-interlaced signals and for modifying the synchronizing operation in response thereto.

24 Claims, 4 Drawing Figures

VERTICAL SYNCHRONIZING CIRCUITRY

CROSS-REFERENCES TO RELATED APPLICATIONS

D. W. Rhee, "Current Drive Deflection Apparatus", Ser. No. 44,476, filed June 8, 1970, now U.S. Pat. No. 3,710,171; W. Elias et al., "Signal Generating Circuit for a Deflection System", Ser. No. 175,159, filed Aug. 26, 1971; D. W. Rhee, "Controlled Oscillator", Ser. No. 207,216, filed Dec. 13, 1971; and D. W. Rhee, "Noise Suppression Circuit", Ser. No. 214,265, filed Dec. 30, 1971, and all assigned to the same assignee as this invention.

BACKGROUND OF THE INVENTION

This invention relates generally to synchronizing circuitry for television receivers and more particularly to digital circuitry for synchronizing the vertical scanning of an image display device to the received television signal.

A television signal transmitted in accordance with current FCC standards includes an RF modulated composite video signal which includes image or video information and synchronizing information to synchronize scanning of an image display device in the receiver with scanning at the transmitter. A standard composite video signal utilizes interlaced scanning, that is, 525 horizontal scanning lines per vertical frame. The vertical frame is divided into two vertical scanning fields, known as the odd and even fields, with each field having 262.5 horizontal lines. If this relationship is maintained exactly, the signal is called "interlaced". The standard composite video signal also includes equalizing pulses and notched or serrated vertical synchronizing pulses. The serrations of the vertical synchronizing pulses are at twice the horizontal synchronizing pulse (scanning) rate and serve to maintain horizontal synchronization during the vertical synchronizing pulse. The equalizing pulses are two sets of six short duration pulses inserted just before and just after the vertical synchronizing pulse to "equalize" the even and odd fields or compensate for the one-half horizontal line in each field so that correct interlace takes place.

In some low cost systems non-interlaced scanning signals are transmitted. Such signals can be found in closed circuit television systems and also in community antenna television systems having local origination and in other or similar systems. Transmitters or studios which generate non-interlaced signals ordinarily do not include serrations during the vertical synchronizing pulses nor equalizing pulses. Although the 525 horizontal line per vertical frame relationship can be maintained without equalizing pulses and serrated vertical synchronizing pulses, it ordinarily will not be maintained exactly.

Typical television receivers include a signal receiver which receives, processes, and demodulates an RF modulated composite video signal which is applied to an image display device such as a cathode ray tube (CRT). The composite video signal includes sycnhronizing information in the form of pulses to synchronizing horizontal and vertical scanning of the image display device to produce a coherent display. The synchronizing pulses are separated from the composite video signal by a synchronizing pulse separator circuit. The horizontal synchronizing pulses are typically used to synchronize a horizontal oscillator to the line scanning frequency of about 15,750 Hz. The output of the horizontal oscillator drives output circuitry which generates appropriate signals for effecting line scanning of the image display device.

The composite synchronizing signal in typical prior art television receivers is also coupled to a discriminator or low pass filter circuit which suppresses the horizontal synchronizing pulses but passes a signal corresponding to the vertical synchronizing pulses to synchronize an oscillator, such as an astable multivibrator, to the vertical field scanning rate of about 60 Hz. The vertical oscillator output drives wave shaping and output circuitry which generates appropriate signals for effecting vertical or field scanning of the image display device. An example of prior art vertical circuitry is illustrated in the copending application of Elias et al., Ser. No. 175,159.

While the various prior art circuits have been used for many years with generally satisfactory results, such circuits have numerous disadvantages, many of which are inherent to the type of circuitry used. Some of these disadvantages are drift, instability, poor noise immunity, poor interlace of even and odd vertical fields, and other similar disadvantages. In general the prior art circuits require a vertical hold control which must be periodically adjusted to compensate for some of the noted disadvantages while other disadvantages cannot be overcome by practical known techniques.

Circuits using digital countdown techniques have also been proposed in the prior art. Some of these proposed countdown circuits utilize a horizontal oscillator which operates at twice the horizontal line scanning frequency and then count the horizontal pulses down to the vertical field scanning frequency with a counter that recycles at a count of 525. Some of the prior art countdown circuits, however, are unduly complex and prohibitively expensive, while others exhibit deficiencies such as improper operation under some circumstances, undesirable sensitivity to noise, and similar disadvantages.

OBJECTS AND SUMMARY OF THE INVENTION

Accordingly, it is an object of this invention to overcome the above-noted and other disadvantages of the prior art.

It is a further object of this invention to provide vertical synchronizing circuitry which is highly immune to noise.

It is a further object of this invention to provide vertical synchronizing circuitry capable of recognizing interlaced and non-interlaced television synchronizing signals and automatically modifying the operation thereof depending on the type of signal received.

It is a further object of this invention to provide vertical synchronizing circuitry wherein the vertical snchronizing pulses are inhibited except when an out-of-synchronization condition is recognized.

It is a still further object of this invention to provide vertical synchronizing circuitry susceptible of being integrated on a monolithic semiconductor chip.

In one aspect of this invention these and other objects and advantages are achieved in vertical synchronizing circuitry for a television receiver which includes pulse providing means, counting means, first detecting means, and second detecting means. The pulse providing means provides pulses at a predetermined rate such as pulses synchronized with a received television signal to the counting means. The counting means counts the pulses received thereby for a predetermined number of counts corresponding to one vertical scanning field. The first detecting means synchronizes the counting means with the received television signal when an out-of-synchronization condition is detected. The second detecting means detects the presence or absence of an interlaced relationship between the vertical and horizontal synchronizing pulses and modifies the operation of the counting means in the absence of an interlaced relationship.

In another aspect of this invention certain of the above-noted and other objects and advantages are achieved in vertical synchronizing circuitry for a television receiver which includes pulse providing means which provides pulses synchronized with the horizontal synchronizing pulses to a counting means which counts the pulses for a predetermined number of counts corresponding to a vertical scanning field. An output means provides an output pulse each time the counting means counts the predetermined number of counts. A detecting means for detecting an out-of-synchronization condition is connected to a reset input of the counting means for providing a reset signal to the counting means when the detecting means detects the out-of-synchronization condition. The detecting means includes first, second, and third gating means and integrating means which is discharged when a synchronized condition is detected.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings.

Figures 1, 3:
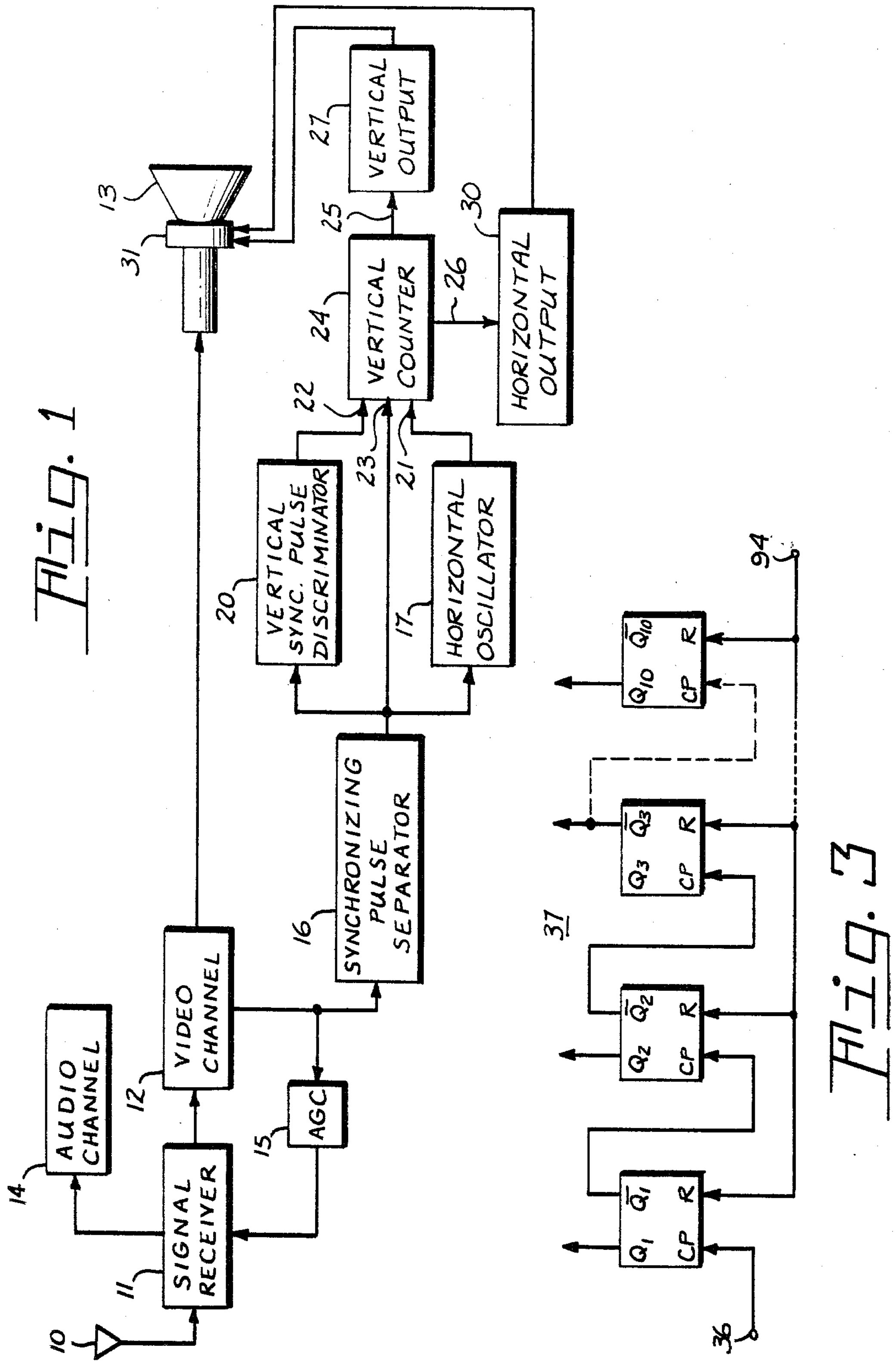
FIG. 1 is a block diagram of a typical television receiver incorporating the preferred embodiment of the invention.
FIG. 3 is a more detailed block diagram of one embodiment of the counter of FIG. 2.

In FIG. 1 an antenna 10 for intercepting transmitted television signals or for receiving such signals by other means is coupled to a signal receiver 11 which processes and demodulates the received signal to provide a composite video signal to a video channel 12. Video channel 12 includes the usual luminance signal processing circuitry and, in the case of a color television receiver, chrominance signal processing circuitry. An output of video channel 12 which consists of one or more signals is coupled to an image display device such as a cathode ray tube (CRT) 13. The audio portion of the received signal is coupled from signal receiver 11 to an audio channel 14. An automatic gain control (AGC) circuit 15 is coupled to video channel 12 to provide AGC signals to the RF and IF amplifiers contained in signal receiver 11.

The composite video signal is coupled from the signal receiver via video channel 12 to a synchronizing pulse separator 16 which can also include a noise suppression circuit such as that disclosed in the copending application of Rhee, Ser. No. 214,265. An output of sync separator 16 provides separated synchronizing pulses to an automatic frequency control circuit and horizontal oscillator 17 which can be of the type disclosed in the copending application of Rhee, Ser. No. 207,216. The separated synchronizing pulses are also coupled to a vertical synchronizing pulse discriminator circuit 20 which provides pulses corresponding to the vertical synchronizing pulses contained in the composite video signal. For the purposes of this application, the synchronizing pulse separator is defined as including discriminator 20.

Outputs from oscillator 17, discriminator 20, and sync separator 16 are coupled to inputs 21, 22, and 23, respectively, of vertical synchronizing circuitry or vertical counter 24. Outputs 25 and 26 of vertical counter 24 are coupled to vertical output circuit 27 and horizontal output circuit 30, respectively, which generate vertical and horizontal scanning signals, respectively, for scanning the image display device in synchronism with the composite video signal of the received television signal. In the case of a display device such as CRT 13, vertical circuit 27 and horizontal circuit 30 generate deflection signals which are coupled to deflection windings contained in a yoke 31 positioned about the neck of CRT 13.

Figure 2:
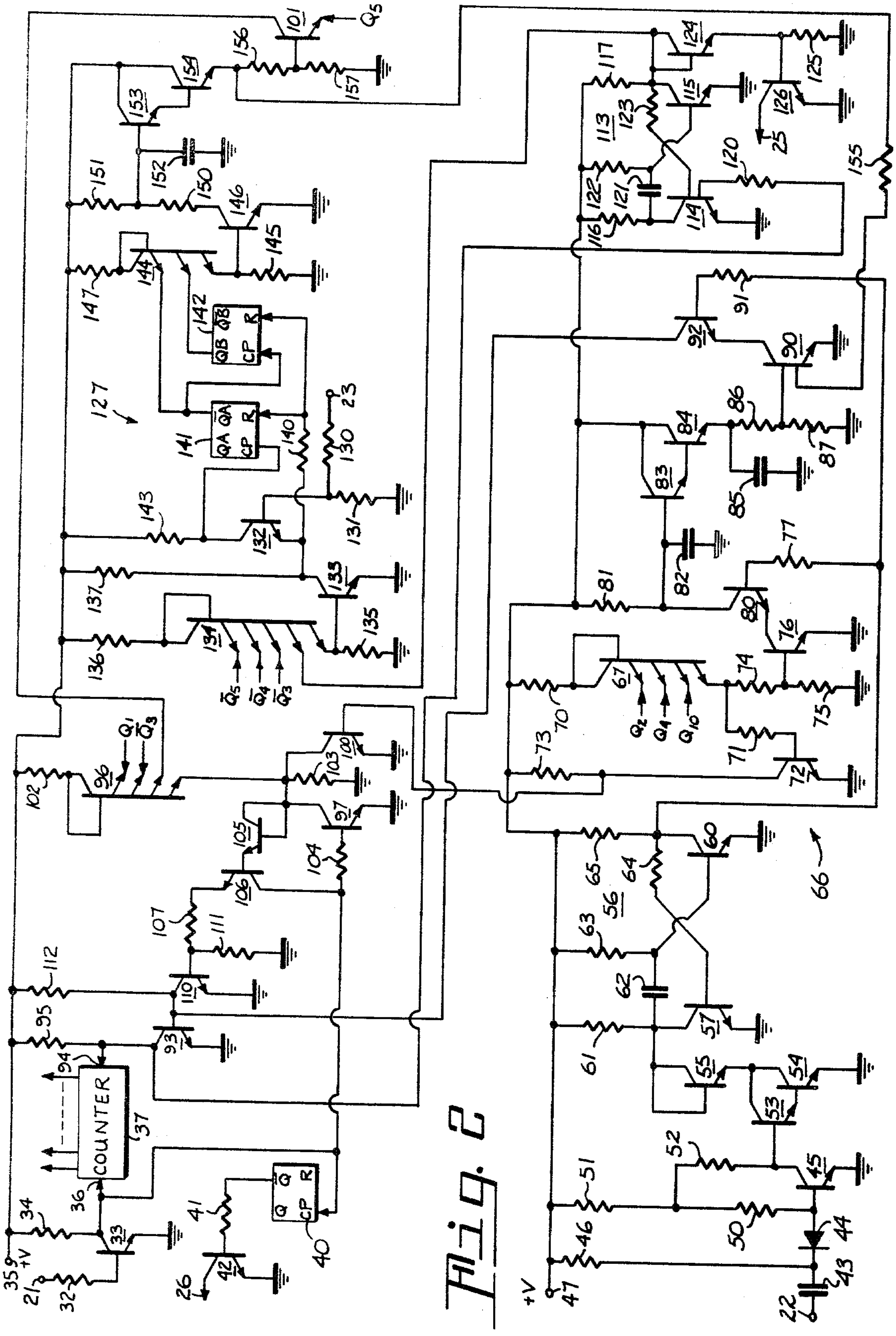
FIG. 2 is a schematic and block diagram illustrating the preferred embodiment of the invention in greater detail.

FIG. 2 illustrates vertical counter 24 in greater detail. Input terminal 21 is coupled via a resistor 32 to a pulse providing means such as a base of a transistor 33. An emitter of transistor 33 is coupled to a common conductor illustrated as ground while a collector is coupled via a resistor 34 to a source of energizing potential illustrated as a terminal 35. The pulse providing means can also include oscillator 17 or a circuit with an equivalent function. The collector of transistor 36 is further connected to a "count" input 36 of a counting means which includes a counter 37 and to a CP input of a bistable circuit illustrated as a flip-flop 40. Preferably flip-flop 40 is an RTL flip-flop which has a $\bar{Q}$ output connected via a resistor 41 to a base of a transistor 42. Transistor 42 has an emitter connected to ground and a collector connected to output terminal 26 and, hence, to horizontal output circuit 30.

In the preferred embodiment counter 37 is a ten-stage flip-flop counter comprising ten RTL flip-flops each having a clock pulse (CP) input, Q and $\bar{Q}$ outputs, and a reset input which, when pulsed, sets the flip-flop to its 1 state. The preferred form of counter 37 is illustrated in FIG. 3 although other suitable counters can be substituted therefor.

Input terminal 22 is connected via a capacitor 43 to the cathode of a diode 44 which has an anode connected to a base of a transistor 45 which has an emitter connected to ground. The junction of capacitor 43 and diode 44 is connected via a resistor 46 to a source of energizing potential illustrated as a terminal 47 which may be the same as source 35. The base of transistor 45 is connected by series resistors 50 and 51 to source 47. A collector of transistor 45 is connected by a resistor 52 to the junction of resistors 50 and 51 and to a base of a transistor 53 which has an emitter connected to a base of a transistor 54. An emitter of transistor 54 is connected to ground. Collectors of transistors 53 and 54 are connected to an emitter of a transistor 55 which has a collector connected to a base thereof and to a pulse forming means illustrated as a monostable multivibrator or one-shot 56. One-shot 56 includes transistors 57 and 60 each having emitters connected to ground. A collector of transistor 57 is connected to the collector of transistor 55, via resistor 61 to source 47, and by a capacitor 62 to a base of transistor 60 which is further connected via a resistor 63 to source 47. A collector of transistor 60 is connected via a resistor 64 to a base of transistor 57 and via a resistor 65 to source 47. The collector of transistor 60 is further connected to a detecting means 66.

The counting means and detecting means 66 include a gating means illustrated as a multi-emitter transistor 67 which has three input emitters and one output emitter. The input emitters are connected, for example, to the Q2, Q4, and Q10 outputs of counter 37. A collector and a base of transistor 67 are connected together and via a resistor 70 to source 47. The output emitter of transistor 67 is connected via a resistor 71 to a base of a transistor 72 which has an emitter connected to ground and a collector connected via a resistor 73 to source 47. The output emitter of transistor 67 is further connected via series resistors 74 and 75 to ground. The junction between resistors 74 and 75 is connected to an input of a gating means illustrated as a base of a transistor 76. An emitter of transistor 76 is connected to ground. The collector of transistor 60 is connected via a resistor 77 to a second input of the gating means illustrated as a base of transistor 80 which has an emitter connected to a collector of transistors 76 and a collector connected to an integrating means.

The integrating means includes a resistor 81 connected between source 47 and the collector of transistor 80 and a capacitor 82 connected therefrom to ground. The junction of resistor 81 and capacitor 82 is connected to a switching or triggering means illustrated as transistors 83 and 84. A base of transistor 83 is connected to the output of the integrating means and an emitter of transistor 83 is connected to a base of transistor 84. Collectors of transistors 83 and 84 are connected to source 47 and the emitter of transistor 84 is connected by a capacitor 85 to ground and by series resistors 86 and 87 to ground. The junction between resistors 86 and 87 is connected to an input means of a gating means illustrated as a base of a transistor 90 which has an emitter connected to ground. The collector of transistor 60 is connected via a resistor 91 to a second input of the gating means illustrated as a base of a transistor 92 which has an emitter connected to a collector of transistor 90. A collector of transistor 92 is connected to a reset input of the counting means illustrated as a base of a transistor 93 which has an emitter connected to ground and a collector connected to a reset input 94 of counter 37 and via a resistor 95 to source 35.

The counting means further includes a gating means illustrated as a multi-emitter transistor 96 and transistors 97 and 100. Transistor 96 has three input emitters two of which are connected, for example, to the Q1 and $\overline{Q3}$ outputs of counter 37. The third input emitter is connected to a collector of a normally non-conducting transistor 101 which has an emitter connected to the Q5 output of counter 37. A collector and base of transistor 96 are connected together and via a resistor 102 to source 35. An output emitter of transistor 96 and the collectors of transistors 97 and 100 are connected together and via a resistor 103 to ground. The emitters of transistors 97 and 100 are connected to ground while a base of transistor 100 is connected to the collector of transistor 72. The collector of transistor 33 is connected via a resistor 104 to a base of transistor 97, the collector of which is connected to a base and a collector of a transistor 105 which has an emitter connected to a base of a transistor 106. A collector of transistor 106 is connected to the collector of transistor 33 and an emitter is connected via a resistor 107 to a base of a transistor 110 which is further connected by a resistor 111 to ground. An emitter of transistor 110 is connected to ground while a collector is connected to a base of transistor 93 and via a resistor 112 to source 35.

The collector of transistor 93, comprising the output terminal of the counting means, is connected to an output means or pulse forming means illustrated as a monostable multivibrator or one-shot 113. One-shot 113 includes transistors 114 and 115 each of which has an emitter connected to ground and a collector connected by resistors 116 and 117, respectively, to source 47. The collector of transistor 93 is connected via a resistor 120 to a base of transistor 114, the collector of which is connected via a capacitor 121 to a base of transistor 115 which is further connected via resistor 122 to source 47. The collector of transistor 115 is connected by a resistor 123 to the base of transistor 114 and further to a base and collector of a transistor 124 which has an emitter connected via a resistor 125 to ground. The emitter of transistor 124 is further connected to a base of a transistor 126 which has an emitter connected to ground and a collector connected to output terminal 25 and, hence, to vertical output circuit 27.

Input terminal 23 is connected to an input of a detecting means 127. Resistors 130 and 131 are connected in series between terminal 23 and ground. The junction of resistors 130 and 131 is connected to an input of a gating means illustrated as a base of a transistor 132 which also includes a transistor 133 and a multi-emitter transistor 134 which has four input emitters and one output emitter connected to a base of transistor 133 and via a resistor 135 to ground. The input emitters of transistor 134 are connected, for example, to the $\overline{Q3}$, $\overline{Q4}$, and $\overline{Q5}$ outputs of counter 37 and to the collector of transistor 115. A base and a collector of transistor 134 are connected together and via a resistor 136 to source 35. An emitter of transistor 133 is connected to ground and a collector is connected via a resistor 137 to source 35.

The collector of transistor 133 is connected to an emitter of transistor 132 and via a resistor 140 to a reset input of a counting means illustrated as two RTL flip-flops 141 and 142 each having reset inputs connected to resistor 140. A collector of transistor 132 is connected via a resistor 143 to source 35 and to a CP input of flip-flop 141. The $\overline{Q}$ output labeled $\overline{QA}$ of flip-flop 141 is connected to the CP input of flip-flop 142 which has a Q output labeled QB. A gating means illustrated as a multiemitter transistor 144 has input emitters connected to the $\overline{QA}$ and QB outputs of flip-flops 141 and 142 and an output emitter conneced via a resistor 145 to ground and to a base of a transistor 146 which has an emitter connected to ground. A base and a collector of transistor 144 are connected together and via a resistor 147 to source 35. A collector of transistor 146 is connected via a resistor 150 to an integrating means which includes a resistor 151 and a capacitor 152 series connected between source 35 and ground with the junction therebetween connected to resistor 150 and to a switching or triggering means. The switching means includes transistors 153 and 154. A base of transistor 153 is connected to the junction of resistor 151 and capacitor 152 and an emitter thereof is connected to a base of transistor 154. The collectors of transistors 153 and 154 are connected to source 35. An emitter of transistor 154 is connected via a resistor 155 to the base of transistor 90 and by a resistor 156 to a base of transistor 101 which is further connected to ground by a resistor 157.

Figure 4:
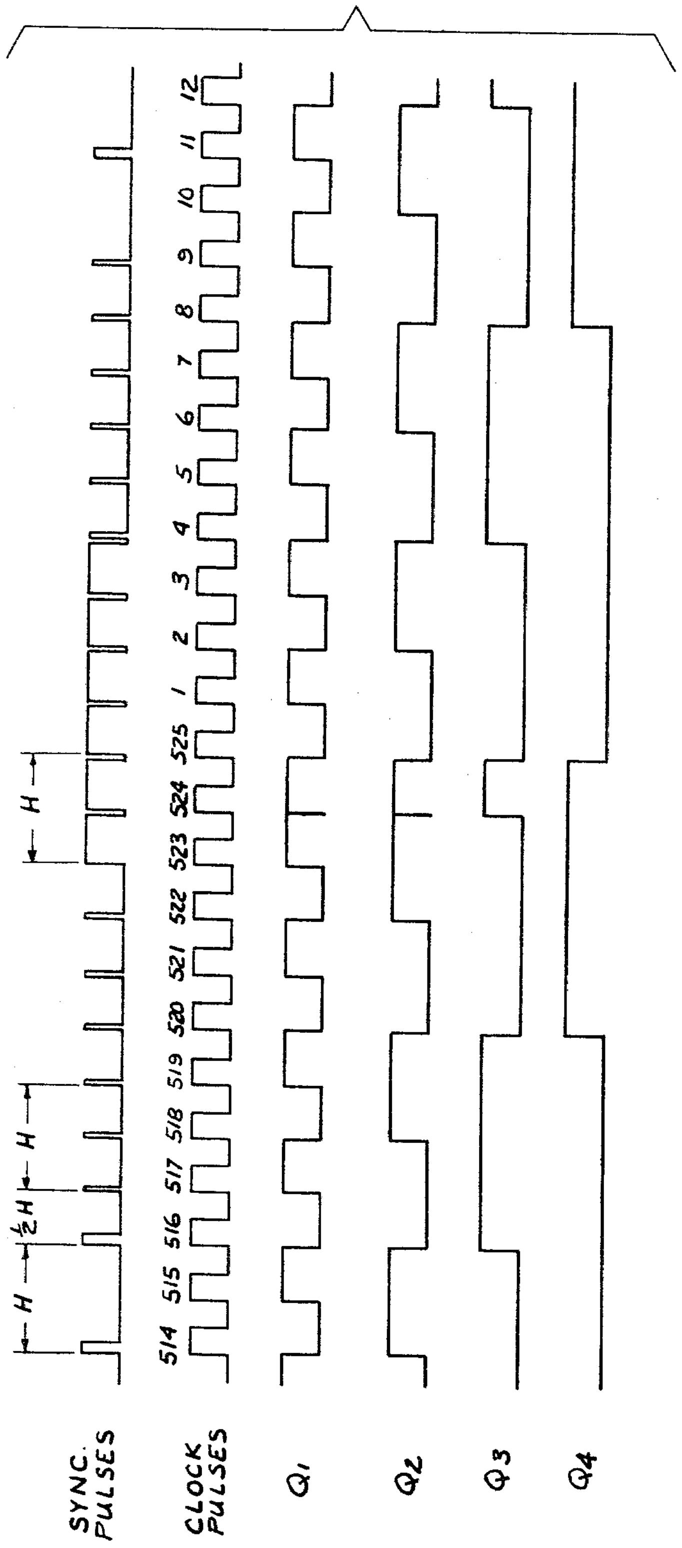
FIG. 4 is a waveform and timing diagram to aid in explaining the operation of the invention.

To describe the operation of the invention, reference will be made to the timing diagram of FIG. 4. The composite synchronizing signal includes horizontal synchronizing pulses spaced exactly one horizontal scanning cycle time (H) apart. At the end of a vertical field six equalizing pulses each of relatively short duration follow the last horizontal pulse. The vertical synchronizing pulse follows the last of the six equalizing pulses and is divided by serrations into six relatively long pulses. The vertical pulse is followed by another set of six equalizing pulses followed by the horizontal pulses of the next field. The top timing waveform of FIG. 4 illustrates the composite synchronizing pulses at the end of the odd field and the start of the even field. The composite synchronizing signal at the end of the even field is identical except that the interval between the last horizontal pulse of the even field and the first equalizing pulse is H instead of one-half H while the interval between the last equalizing pulse and the first horizontal pulse of the odd field is one-half H instead of H.

The second timing waveform of FIG. 4 illustrates the clock pulses applied to input 36 of counter 37 and to the CP input of flip-flop 40. These pulses are derived from horizontal oscillator 17 and are coupled via terminal 21 and transistor 33 of vertical counter 24. While other means can be used to generate the clock pulses, they are derived from the horizontal oscillator in the preferred embodiment. Preferably the pulse rate of the clock pulses is twice the rate of the horizontal synchronizing pulses to account for the one-half horizontal line in each of the even and odd fields. The clock pulses are numbered in accordance with the count of counter 37 part of which is illustrated in timing waveforms Q1–Q4 of FIG. 4 corresponding to the Q1–Q4 outputs of counter 37. The clock pulses are divided by two by flip-flop 40 and are coupled via transistor 42 to output terminal 26 and, hence, to horizontal output circuit 30.

Assume that counter 37 is counting the clock pulses in accordance with the timing illustrated in FIG. 4. The Q2, Q4, and Q10 outputs of counter 37 are coupled to the input emitters of transistor 67. As long as at least one of the emitters of transistor 67 is low or ground potential (a logic 0), the current in transistor 67 will flow out of that emitter and will not flow out of the output emitter to transistors 72 and 76. From counts 1 through 511 of counter 37 the emitter connected to Q10 will be low. At count 512 that emitter will receive a high voltage or logic 1, however, Q4 or Q2 will be low. As is illustrated in FIG. 4, at the count of 520 Q4 will be a 1 and at the count of 522 each of the three input emitters of transistor 67 receive a logic 1. Thus, during the counts 522 and 523 current will flow out of the output emitter of transistor 67 to turn transistors 72 and 76 ON.

When transistor 72 turns ON, transistor 100 is turned OFF. The collector voltage of transistors 97 and 100, however, remains low as long as the output emitter of transistor 96 is low. During count 523, Q1 and $\overline{Q3}$ are both 1 so that the current through transistor 96 flows out of the output emitter to the collector of transistor 97. During the last half of clock period 523, transistor 97 is turned OFF thereby developing a voltage across resistor 103 which is coupled via transistor 105 to the base of transistor 106 to turn transistor 106 ON. Transistor 106 saturates, but since the collector of transistor 33 is at a low potential during the last half of each clock period, the collector and hence the emitter of transistor 106 are held at low potentials and a charge is stored between the collector and emitter.

The leading edge of clock pulse 524 will increase the voltage of the collector of transistor 106 via resistor 34. Therefore, for a short period a current will flow through the collector and emitter of transistor 106 and resistor 107 to the base of transistor 110, until the stored charge between the collector and emitter junction of transistor 106 is discharged. During this short period, the current applied to the base of transistor 110 turns transistor 110 ON, thereby turning transistor 93 OFF to provide a reset pulse to reset input 94 of counter 37. The reset pulse sets each flip-flop of counter 37 to a 1 state (maximum count). The next clock pulse, number 525, recycles counter 37 to zero and counter 37 starts counting clock pulses for the next vertical scanning field.

The positive reset pulse is coupled from the collector of transistor 93 to the base of transistor 114 to switch normally OFF transistor 114 ON. When transistor 114 turns OFF, the negative going voltage at its collector is coupled through capacitor 121 to the base of normally ON transistor 115 which then turns OFF. Transistor 115 remains OFF until capacitor 121 charges sufficiently through resistor 122 to permit transistor 115 to turn ON thereby turning transistor 114 OFF until the next reset pulse from transistor 93. The output pulse from the collector of transistor 115 is coupled through transistor 124 to turn transistor 126 ON thereby providing a vertical output pulse of controlled amplitude and duration at terminal 25. The duration of the vertical output pulse is determined by the time constant of resistor 122 and capacitor 121. In one satisfactory embodiment of this invention, a 0.7 millisecond vertical output pulse was provided.

Summarizing the operation described thus far, counter 37 counts clock pulses until count 522 is reached at which time transistor 67 turns transistor 72 ON which turns transistor 100 OFF. At count 523, transistor 96 provides current to the collector of transistor 97 which causes transistor 106 to saturate when transistors 97 and 100 turn OFF. The leading edge of clock pulse 524 is coupled through transistor 106 to turn transistor 110 ON and transistor 93 OFF. The reset pulse provided by transistor 93 causes counter 37 to reset and causes one-shot 113 to provide a vertical output pulse.

Negative-going vertical synchronizing pulses are provided at terminal 22 by discriminator 20. These pulses which are approximately coincident with the start of the vertical pulse illustrated in FIG. 4, are coupled via capacitor 43 and diode 44 to turn transistor 45 OFF which turns transistors 53 and 54 ON. The negative-going pulse at the collectors of transistors 53 and 54 is coupled through transistor 55 to the collector of normally OFF transistor 57 and via capacitor 62 to the base of normally ON transistor 60. Thus, transistor 57 turns ON and transistor 60 turns OFF and remains OFF until capacitor 62 charges through resistor 63. When transistor 60 turns ON again turning transistor 57 OFF, capacitor 62 recharges through resistor 61. In one satisfactory embodiment of this invention, the duration of the vertical sync pulse provided at the collector of transistor 60 was about two clock periods.

One additional feature of one-shot 56 is that after it has been triggered once, it will not trigger again immediately thereby providing noise immunity. One-shot 56 will not retrigger immediately because capacitor 62 must recharge through resistor 61 to a voltage higher than the two base-to-emitter junction voltages (2×0.75v). One base-to-emitter junction voltage is due to transistor 55 and another is due to the base-to-emitter junction of transistor 54 when transistor 53 is in saturation. This period of noise immunity can be controlled by the size of resistor 61 which in one satisfactory embodiment was more than 100 times as large as resistor 63.

The positive synchronizing pulse of controlled amplitude and duration from the collector of transistor 60 is coupled through resistors 77 and 91 to transistors 80 and 92, respectively. Transistor 67 turns transistor 76 ON during counts 522, 523, and 524 to establish a gating interval or window. If a vertical sync pulse occurs during this gating interval, both of transistors 76 and 80 will be turned ON at the same time and capacitor 82 will be discharged through transistors 76 and 80. Resistor 81 and capacitor 82 comprise an integrating means wherein capacitor 82 slowly charges through resistor 81. When transistors 76 and 80 are gated ON simultaneously, counter 37 is properly synchronized with the received composite video signal and capacitor 82 discharges thereby preventing transistors 83 and 84 from turning ON. When transistors 83 and 84 are OFF, transistor 90 is also OFF. Thus, the vertical sync pulse coupled to the base of transistor 92 is not coupled through transistor 92. Note that gating transistor 67 performs the dual function of initiating the reset action for resetting counter 37 and establishing a gating interval to determine if counter 37 is properly synchronized.

In the above-mentioned embodiment of the invention, the time constant of resistor 81 and capacitor 82 was selected to be sufficiently long so that seven or eight vertical synchronizing intervals or cycles (scanning fields) were required before capacitor 82 charged sufficiently to turn transistors 83, 84, and 90 ON. After seven or eight vertical sync intervals during which counter 37 is out of synchronization and transistors 76 and 80 are not turned ON simultaneously, capacitor 82 charges sufficiently to turn transistors 83, 84, and 90 ON. Thus, the next vertical sync pulse coupled to the base of transistor 92 is coupled to the base of transistor 93 to turn transistor 93 OFF which resets counter 37 and triggers one-shot 113. Since counter 37 is then set to all "1" outputs, transistors 67 turns transistor 76 ON to discharge capacitor 82.

The described synchronizing operation provides highly noise immune operation. Even if noise should falsely trigger one-shot 56, the noise pulse will not be coupled through transistor 92. Also, if a vertical sync pulse is missing, for example, because one-shot 56 was triggered by a noise burst and the received vertical sync pulse could not trigger it again, the operation of counter 37 will not be affected unless several successive vertical sync pulses are all missing, which of course is highly unlikely.

The operation described thus far assumes that the received signal is a standard properly interlaced signal. As was noted above, however, in some cases a received signal may not be properly interlaced. For the purposes of this application, a non-interlaced television signal is defined as a signal which does not contain serrated vertical synchronizing pulses and/or equalizing pulses. The interlace or non-interlace detector 127 detects whether or not the composite synchronizing signal contains serrated vertical synchronizing pulses or equalizing pulses or both.

The composite synchronizing signal is coupled to input terminal 23 and hence to the base of transistor 132. The input emitters of transistor 134 receive the vertical output pulse and the $\overline{Q3}$, $\overline{Q4}$, and $\overline{Q5}$ outputs of counter 37. The vertical output pulse which occurs when counter 37 is reset starts at about count 524 and lasts for about 0.7 millisecond or 22 clock pulse periods. Thus, during counts 525, 1, 2, and 3, each of the input emitters of transistor 134 will receive a logic 1 and transistor 133 will be turned ON to establish a gating interval or window. When transistor 133 turns ON, the emitter of transistor 132 is grounded and the composite synchronizing signal is coupled to the CP input of flip-flop 141. Due to the tolerance provided by the synchronizing circuitry, either vertical sync pulse serrations or equalizing pulses or a combination of both can occur during the gating interval of transistor 134. Note that during the gating interval there are three positive-going pulse transistions in the composite synchronizing signal. The transistion coincident with the beginning of the gating interval normally will not be counted and the transition coincident with the end of the gating interval will not affect the operation because flip-flops 141 and 142 will be reset immediately following it. The first transition causes flip-flop 141 to provide a $\overline{QA} = 1$ output which triggers flip-flop 142 to provide a $QB = 0$ output. The second transition causes flip-flop 141 to provide a $\overline{QA} = 0$ output which does not trigger flip-flop 142. The third transition causes flip-flop 141 to provide a $\overline{QA} = 1$ output and flip-flop 142 to provide a $QB = 1$ output. Thus, both input emitters of gating transistor 144 are 1 and transistor 146 is turned ON to discharge capacitor 152 which comprises part of an integrating means. When capacitor 152 is discharged through resistor 150 and transistor 146, transistors 153, 154, and 101 remain OFF. At the end of the gating interval transistor 134 turns transistor 133 OFF to turn transistor 132 OFF and reset flip-flops 141 and 142 to 1 states.

If a non-interlaced signal is received, the vertical sync pulse will not be serrated and no equalizing pulses will be present. Signals of this type typically will include horizontal sync pulses during the equalizing pulse interval. Note, however, that even when horizontal sync pulses occur during the gating interval, no more than two transitions will be counted by flip-flops 141 and 142. Thus, transistor 144 will not turn transistor 146 ON and capacitor 152 will not be discharged. After capacitor 152 remains undischarged for a sufficient time, transistors 153 and 154 turn ON to turn transistor 90 ON via resistor 155. In the above-mentioned embodiment of the invention the values of resistors 150 and 151 and capacitor 152 were selected such that capacitor 152 charged sufficiently during three vertical scanning fields or cycles to turn transistors 153 and 154 ON.

Since transistor 90 is continuously ON when a non-interlaced signal is received, the received vertical sync pulses are coupled via transistor 92 to the base of transistor 93 to reset counter 37. Thus, when detecting means 127 detects a non-interlaced signal, the operation of the counting means and detecting means 66 is modified so that counter 37 is reset by each vertical synchronizing pulse, that is, counter 37 is directly triggered by the received signal. During this mode of operation, the noise suppressing feature of one-shot 56 takes on added importance because the noise suppression normally provided by detecting means 66 is circumvented.

If for some reason a vertical synchronizing pulse is missing, counter 37 will not be reset and will continue counting. To prevent an entire vertical cycle from being missed, a provision is made to reset counter 37 at a predetermined maximum count which in the above-mentioned practical embodiment was selected to be 540. To provide this feature transistors 153 and 154 also turn transistor 101 ON when a non-interlaced signal is detected. Transistor 101 couples the Q5 output of counter 37 to the third input emitter of transistor 96. If counter 37 is not reset, transistor 67 will turn transistor 72 ON during counts 538 and 539 because Q10, Q4, and Q2 are each 1 during those counts. Thus, transistor 100 will be turned OFF. Transistor 96 will provide an output during count 539 because Q1, $\overline{Q3}$, and Q5 are each 1 during that count. Thus, a reset pulse will be generated at count 540 by transistors 97, 105, 106, 110, and 93 in the manner described above. Connecting the Q5 output of counter 37 to an input emitter of transistor 96 during reception of a non-interlaced signal also prevents counter 37 from being reset at a count of 524 because Q5 is 0 during counts 522 and 523.

In the above-mentioned practical embodiment of the invention the circuitry illustrated in FIG. 2 was designed for integration on a single monolithic semiconductor chip thereby providing the additional advantages of inexpensive construction, high reliability, and small size. While conceptually flip-flop 40 is part of the horizontal circuitry, it was placed on the same chip as the vertical circuitry for convenience. Also one-shot 56 can be considered to be either part of vertical synchronizing pulse discriminator 20 or part of detecting means 66 because it converts the vertical sync pulse from discriminator 20 into a form suitable for application to detecting means 66.

Those skilled in the art will realize that many modifications of the disclosed preferred embodiment can be made. For example, various techniques can be used for recycling or resetting a counter at a particular count. Also other forms of non-interlace detectors can be used which perform a function the same as or similar to detecting means 127.

Accordingly, while there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having a signal receiver, a synchronizing pulse separator connected thereto, and vertical and horizontal circuits for generating scanning signals in synchronism with a received television signal, improved vertical synchronizing circuitry comprising:

pulse providing means connected to said synchronizing pulse separator for providing pulses synchronized with said received television signal;

counting means connected to said pulse providing means for receiving and counting the pulses therefrom for a predetermined number of counts corresponding to one vertical scanning field;

first detecting means connected to said synchronizing pulse separator and to said counting means for synchronizing said counting means with said received television signal when an out-of-synchronization condition is detected;

output means connected to said counting means for providing an output pulse each time said counting means counts said predetermined number of counts; and second detecting means connected to said counting means and to said synchronizing pulse separator for detecting the presence of an interlaced relationship between the vertical and horizontal synchronizing pulses and for modifying the operation of said counting means in the absence of a detected interlaced relationship.

2. Vertical synchronizing circuitry as defined in claim 1 wherein said second detecting means detects the presence or absence of serrations of the vertical synchronizing pulse or of equalizing pulses.

3. Vertical synchronizing circuitry as defined in claim 1 wherein said counting means includes a counter including reset means and further includes gating means connected to said counter for providing a reset signal to said reset means to reset said counter when the state of said counter indicates that said predetermined number of counts have been counted.

4. Vertical synchronizing circuitry as defined in claim 3 wherein said pulse providing means is synchronized to the horizontal synchronizing pulses and generates pulses at a rate twice the rate of horizontal synchronizing pulses and wherein said reset means resets said counter every 525 counts.

5. Vertical synchronizing circuitry as defined in claim 2 wherein said second detecting means includes a first gating means connected to said counting means for gating output pulses from said synchronizing pulse separator therethrough during a predetermined gating interval, second counting means for counting the number of pulses from said synchronizing pulse separator during said gating interval, second gating means connected to said second counting means for providing a signal indicative of the count attained by said second counting means, and means connecting said second gating means to said first detecting means for causing said first-named counting means to be reset by each vertical synchronizing pulse of said received television signal.

6. Vertical synchronizing circuitry as defined in claim 5 wherein said means connecting said second means to said first detecting means includes integrating means connected to said second gating means, said second gating means discharging said integrating means when said second counting means attains a predetermined count, and switching means connected to said integrating means for switching from a first state to a second state when said integrating means is not discharged for a predetermined number of vertical scanning fields.

7. Vertical synchronizing circuitry as defined in claim 1 including pulse forming means connected for receiving vertical synchronizing pulses from said synchronizing pulse separator and for providing pulses of controlled duration and amplitude in response thereto to said first detecting means.

8. Vertical synchronizing circuitry as defined in claim 1 wherein said output means includes pulse forming means for providing output pulses of controlled duration and amplitude.

9. Vertical synchronizing circuitry as defined in claim 1 wherein said counting means includes a counter, first gating means connected to said counter for providing a signal during predetermined range of counts of said counter, means connected between said first gating means and said counter for developing a reset signal for resetting said counter in response to the signal from said first gating means, and said first detecting means includes means connected to said first gating means and to said synchronizing pulse separator for providing an output signal after a predetermined number of vertical scanning fields during which the signal from said first gating means is not coincident with vertical synchronizing pulses from said synchronizing pulse separator, and second gating means connected to said means for providing an output signal after a predetermined number of vertical scanning fields, said synchronizing pulse separator, and to a reset input of said counting means for coupling a vertical synchronizing pulse to said reset input in response to an output signal from said means for providing an output signal after a predetermined number of vertical scanning fields.

10. Vertical synchronizing circuitry as defined in claim 9 wherein said means for providing an output signal after a predetermined number of vertical scanning fields includes integrating means and means for discharging said integrating means connected to said first gating means, to said synchronizing pulse separator, and to said integrating means for discharging said integrating means when the signal from said first gating means is coincident with a vertical synchronizing pulse.

11. In a television receiver having a signal receiver for processing a received television signal to provide a composite video signal, an image display device connected to said signal receiver for displaying an image derived from said composite video signal, a synchronizing pulse separator means connected to said signal receiver for separating synchronizing pulses from said composite video signal, and scanning signal generating means connected to said synchronizing pulse separator means for providing scanning signals to said image display device, improved vertical synchronizing circuitry comprising:

pulse providing means connected to said synchronizing pulse separator means for providing pulses synchronized with the horizontal synchronizing pulses of said composite video signal;

counting means connected to said pulse providing means for counting the pulses therefrom for a predetermined number of counts corresponding to a vertical scanning field;

output means connected to said counting means for providing an output pulse each time said counting means counts said predetermined number of counts;

detecting means connected to said synchronizing pulse separator means and to said counting means for detecting an out-of-synchronization condition, said detecting means including first gating means connected to said counting means for providing a signal during a predetermined range of counts of said counting means, integrating means, second gating means connected to said first gating means, to said synchronizing pulse separator means and to said integrating means for discharging said integrating means when the signal from said first gating means is coincident with a vertical synchronizing pulse, and third gating means connected to said integrating means, said synchronizing pulse separator means, and to a reset input of said counting means for providing a reset signal to said counting means when said integrating means is not discharged for a predetermined number of vertical scanning fields.

12. Vertical synchronizing circuitry as defined in claim 11 wherein said synchronizing pulse separator means includes pulse forming means connected for providing pulses of controlled amplitude and duration in response to the vertical synchronizing pulses contained in said composite video signal to said detecting means.

13. Vertical synchronizing circuitry as defined in claim 12 wherein said pulse forming means includes a monostable multivibrator connected for receiving the vertical synchronizing pulses and for providing the pulses of controlled amplitude and duration.

14. Vertical synchronizing circuitry as defined in claim 11 wherein said integrating means includes a resistor and capacitor charging circuit, said capacitor being periodically discharged when the signal from said first gating means is coincident with a vertical synchronizing pulse.

15. Vertical synchronizing circuitry as defined in claim 11 wherein said pulse providing means provides pulses at twice the horizontal line scanning rate and said counting means includes reset means for resetting said counting means every 525 counts.

16. Vertical synchronizing circuitry as defined in claim 11 wherein said output means includes a monostable multivibrator for providing an output pulse of predetermined amplitude and duration each time said counting means provides a pulse thereto.

17. In a television receiver having a synchronizing pulse separator for separating synchronizing pulses from a composite video signal, vertical synchronizing circuitry comprising:

pulse providing means for providing pulses at a predetermined rate;

counting means connected to said pulse providing means for counting the pulses therefrom for a predetermined number of counts corresponding to one vertical scanning field;

first detecting means connected to said synchronizing pulse separator and to said counting means for synchronizing said counting means with said synchronizing pulses when an out-of-synchronization condition is detected; and second detecting means connected to said counting means and to said synchronizing pulse separator for detecting the absence of an interlaced relationship between the vertical and horizontal synchronizing pulses and for modifying the operation of said counting means in the absence of an interlaced relationship.

18. Vertical synchronizing circuitry as defined in claim 17 wherein said counting means includes a counter and means for resetting said counter at a predetermined count.

19. Vertical synchronizing circuitry as defined in claim 17 including means connected to said second detecting means and to said synchronizing pulse separator and further connected to said counting means for coupling vertical synchronizing pulses to said counter means when said second detecting means detects the absence of an interlaced relationship.

20. Vertical synchronizing circuitry as defined in claim 19 wherein said counting means includes a counter and means for resetting said counter at a first predetermined count connected to said second detecting means whereby said second detecting means inhibits said means for resetting said counter from resetting said counter at said first predetermined count and causes said counter to be reset at a second predetermined count.

21. Vertical synchronizing circuitry as defined in claim 17 wherein said second detecting means detects the absence of serrations of the vertical synchronizing pulses or of equalizing pulses.

22. Vertical synchronizing circuitry as defined in claim 21 wherein said second detecting means includes gating means connected to said counting means and said synchronizing pulse separator for coupling said synchronizing pulses therethrough during a predetermined range of counts of said counting means, second counting means connected to said gating means for receiving said synchronizing pulses during said predetermined range of counts, and means connected to said second counting means for providing a signal indicative of the absence of an interlaced relationship when said second counting means attains a count less than a predetermined count during said predetermined range of counts.

23. Vertical synchronizing circuitry as defined in claim 22 wherein said means connected to said second counting means includes second gating means connected to said second counting means for providing an output signal when said second counting means attains a predetermined count, integrating means connected to said second gating means whereby said output signal from said second gating means discharges said integrating means, and switching means connected to said integrating means for providing a signal to modify the operation of said first-named counting means when said integrating means attains a predetermined charge.

24. Vertical synchronizing circuitry as defined in claim 17 wherein said first detecting means includes first gating means connected to said counting means and to said synchronizing pulse separator, integrating means connected to said first gating means whereby said first gating means discharges said integrating means when a vertical synchronizing pulse occurs during a predetermined range of counts of said counting means, and second gating means connected to said integrating means and to said synchronizing pulse separator for coupling a vertical synchronizing pulse to a reset input of said counting means when said integrating means attains a predetermined charge.

* * * * *

PO-1050
(5/69)

UNITED STATES PATENT OFFICE
CERTIFICATE OF CORRECTION

Patent No. 3,751,588 Dated August 7, 1973

Inventor(s) Robert Roy Eckenbrecht and Dong Woo Rhee

It is certified that error appears in the above-identified patent and that said Letters Patent are hereby corrected as shown below:

Col. 1, line 9 - after "1971" insert ", now U.S. Patent No. 3,731,138"

Col. 1, line 9 - delete "Controlled Oscillator" and insert "Television Horizontal Transistor Oscillator and AFC Network"

Col. 1, line 10- after "1971" insert ", now U.S. Patent No. 3,730,989"

Col. 1, lines 61-62 - delete "synchronizing" and insert "synchronize"

Col. 8, line 34 - delete "OFF" and insert "ON"

Col. 12, line 61 (Claim 6) after "second" insert "gating"

Col. 13, line 67 (Claim 11) after "counts;" insert "and"

Signed and sealed this 19th day of February 1974.

(SEAL)
Attest:

EDWARD M.FLETCHER,JR.
Attesting Officer

C. MARSHALL DANN
Commissioner of Patents